(12) United States Patent  
Messerly et al.

(10) Patent No.: US 7,916,762 B2  
(45) Date of Patent: Mar. 29, 2011

(54) PHASED LASER ARRAY WITH TAILORED SPECTRAL AND COHERENCE PROPERTIES

(75) Inventors: Michael J Messerly, Danville, CA (US); Jay W Dawson, Livermore, CA (US); Raymond J Beach, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 118 days.

(21) Appl. No.: 12/472,564

(22) Filed: May 27, 2009

(65) Prior Publication Data

US 2009/0296747 A1    Dec. 3, 2009

Related U.S. Application Data

(60) Provisional application No. 61/056,267, filed on May 27, 2008.

(51) Int. Cl.  
*H01S 3/098* (2006.01)

(52) U.S. Cl. ............................................. 372/18; 372/20
(58) Field of Classification Search .................. 372/23, 372/29.01, 25, 28  
See application file for complete search history.

(56) References Cited

U.S. PATENT DOCUMENTS

| | | | | |
|---|---|---|---|---|
| 5,723,856 | A * | 3/1998 | Yao et al. | 250/227.11 |
| 5,955,992 | A * | 9/1999 | Shattil | 342/375 |
| 6,788,718 | B1 * | 9/2004 | Gidon et al. | 372/32 |
| 6,839,363 | B2 * | 1/2005 | Lin et al. | 372/18 |
| 6,845,108 | B1 * | 1/2005 | Liu et al. | 372/20 |

* cited by examiner

*Primary Examiner* — Minsun Harvey  
*Assistant Examiner* — Tuan N. Nguyen  
(74) *Attorney, Agent, or Firm* — John P. Wooldridge

(57) ABSTRACT

Architectures for coherently combining an array of fiber-based lasers are provided. By matching their lengths to within a few integer multiples of a wavelength, the spatial and temporal properties of a single large laser are replicated, while extending the average or peak pulsed power limit.

14 Claims, 2 Drawing Sheets

PHASED LASER ARRAY WITH TAILORED SPECTRAL AND COHERENCE PROPERTIES

This application claims priority to U.S. Provisional Application No. 61/056,267, titled "Phased Laser Array with Tailored Spectral and Coherence Properties," filed May 27, 2008.

The United States Government has rights in this invention pursuant to Contract No. DE-AC52-07NA27344 between the United States Department of Energy and Lawrence Livermore National Security, LLC.

BACKGROUND OF THE INVENTION

1. Field of the Invention

The present invention relates to high power lasers, and more specifically, it relates to techniques for combining fiber lasers.

2. Description of Related Art

Fiber lasers offer many advantages over conventional lasers, including their inherent robustness, their ability to create diffraction limited beams (especially advantageous for lasers that must propagate over large distances) and their ability to efficiently radiate waste heat. The latter stems from the fact that the ratio of their surface area to their enclosed volume is relatively high. Unfortunately, the cross-sectional area of a fiber tends to be relatively small. Thus, for a given power or pulse energy, the power or energy density inside a fiber tends to be much higher than it would be inside a conventional laser. If the power or energy density becomes too large, undesirable nonlinear phenomena or catastrophic damage can be triggered, and the output of the laser can be limited.

One way to raise the nonlinear and damage thresholds is to increase the size (cross-section) of the fiber. A practical upper manufacturing bound on the fiber cross section is roughly 1000 $\mu m^2$. Further scaling can make the fiber prone to bend-induced losses, and degrades the quality of the emitted beam.

A well-known alternative is to combine the outputs of many fiber lasers. Such combination techniques are generally classified as coherent or incoherent. Incoherent combination refers to the fact that the peaks and troughs of the sinusoidal electro-magnetic waves emitted by the lasers are not synchronized—that is, they vary randomly with time. A simple (though, in some cases, effective) example is to combine the lasers at various angles at a common target, similar to simultaneously shining several flashlights onto a single spot. Another incoherent technique is to combine the lasers in the spectral domain; the lasers in the array are forced to emit at a series of non-overlapping wavelengths, and their outputs are combined by a spectrally-selective device such as a diffraction grating.

Coherent combination means that, at the point of combination, the phases of the lasers are the same, or within the needs of a given application, nearly the same. While some research suggests that this co-phasing or phase-locking may occur naturally—"passive phasing"—today it is most often forced to occur by monitoring and adjusting the phases of the individual lasers with high speed electronics, feedback loops, and appropriate phase-adjusting actuators, and has been referred to as—"active phasing."

Once the lasers in a coherent combination scheme are co-phased, either by passive or active means, they must be combined. This has been accomplished in several ways. They may be combined by a series of beam-splitters or a diffractive optical element, or they may be allowed to simply diffract and combine as they propagate toward some distant target.

Each of the various combining schemes has its own advantages and disadvantages. Actively-phased coherent beam combining has demonstrated the highest combined power of 1.2 kW, generated by an array of 16 lasers. This result does not compare well to the highest reported power from a single laser, though, which now stands at 6 kW. The arrayed power is relatively modest because has not been understood how to combine lasers that have broad spectral bandwidths, such as those that can now generate 6 kW. Instead, the array combines lasers having very narrow spectral widths. The narrow sources have two advantages: they allow lasers of disparate lengths to be combined—in the case of the 1.2 kW array, the lengths can differ by tens of meters—and they minimize the chromatic spread of the combined beam. The narrow sources also have a distinct disadvantage: they tend to suffer from stimulated Brillion scattering (SBS), a nonlinear phenomenon which today limits the power of the individual lasers to roughly 100 W.

Over the past several years, sizable investments and considerable effort and have been devoted to increasing the SBS power limit. One approach is to increase the size of the light-guiding portion of the fiber, but this tends to make the fibers prone to bend-induced losses and degrades the quality of the beams they emit. Other approaches are to generate a thermal gradient along the fiber's length or to create fibers that guide light but not sound. All of these approaches, combined, have raised the SBS threshold to 500 W, though it is not yet known what the limit will be for practical field deployments.

In many prior art beam-combining schemes, it is necessary to control the lengths of the constituent lasers to enhance their coupling efficiency. In such schemes, the lengths of the individual lasers are controlled to within an integer multiple of their common lasing wavelength, and in all known implementations for these schemes the multiple is quite large, ranging from $10^3$ to $10^9$. While such a large multiple greatly simplifies fabrication, it necessarily makes the array's temporal and spectral properties different from those of its constituent lasers. In certain applications, such as those involving the generation or amplification of mode-locked laser pulses, this can be unacceptable.

SUMMARY OF THE INVENTION

It is an object of the present invention to combine the outputs of multiple fiber lasers into a single beam—for example, to overcome the power limitation imposed by a single laser.

Another object is to provide an array of lasers whose relative phases are controlled to within a small fraction of a cycle, and whose absolute lengths are controlled to within a few wavelengths.

These and other objects will be apparent based on the disclosure herein.

In the present invention, the spectral and temporal properties of a fiber laser array are controlled by precise control of the integer multiple of wavelengths of the lengths of the fibers of the array. For example, by making this term near zero (that is, making the laser lengths nearly identical), the temporal and spectral properties of the array can be made identical to those of the individual lasers.

Laser arrays of this type can be used to generate or amplify mode-locked laser pulses, increasing the energy of an individual pulse by a factor very near the number of lasers in the array. This can be especially advantageous for optical fiber-based lasers, which are currently limited to roughly 1 mJ pulses or 10 kW CW per fiber.

The arrays can also be used to overcome the power-handling limitation of an array of CW (continuous-wave) or Q-switched (short pulses having incoherent spectra) lasers, which is important for DOD-centric applications such as missile-defense and remote sensing.

High energy pulsed lasers and high power CW lasers are often used in commercial applications such as laser machining, and for future consumer-oriented display systems, could provide a means to increase the quantity of visible light that can be created via nonlinear frequency-conversion.

Consider an array of lasers. Current schemes control their relative phases to within a small fraction of a cycle, but allow the lengths of the lasers to differ by a large integer number of wavelengths—"modulo-$2\pi$" phase correction. The present invention controls the spectral and temporal properties of the array by also controlling the value of the integer multiple of wavelengths of the fiber lengths. For example, to make the spectrum of the array nearly identical to the spectra of the constituents, the integer multiple is made to be very nearly zero (i.e., the lengths of the lasers are essentially identical). As the length differential drops from hundreds of wavelengths to a few wavelengths, the spectrum broadens from tenths of nanometers to tens of nanometers—essential for applications that involve short-pulse lasers.

It is also possible to tune the lengths of the lasers in a resonant amplifier array so that it multiplies the pulse rate by an integer multiple. That is, for an input pulse rate of $f_o$ the output rate would be m $f_o$ where m is an integer (bounded by the number of lasers in the array). The peak power of each of the lasers is correspondingly decreased by m. These pulses can then be amplified to the maximum energy that can be tolerated by the individual fibers, and de-phased to create a stream of pulses at $f_o$, but the pulse energy is $m^2$ times higher than what could be tolerated by single fiber.

U.S. Provisional Application No. 61/056,267, titled "Phased Laser Array with Tailored Spectral and Coherence Properties," filed May 27, 2008, is incorporated herein by reference.

As discussed herein, exemplary embodiments of the invention include a fiber optic laser array and a method of operation of the array. The fiber optic array in this exemplary embodiment comprises: a plurality of fiber optics, wherein each fiber optic of said plurality of fiber optics comprises an active laser gain medium; means for controlling the length of said each fiber optic; means for optically pumping said active laser gain medium of said each fiber optic to produce a plurality of laser beams; and means for phase locking said plurality of laser beams. The means for controlling the length is configured to the control the absolute length of said each fiber optic to one another to be within a few wavelengths of light. The means for controlling comprises a mechanism for altering each length of said lengths. The mechanism may be a PZT. Each laser beam of said plurality of laser beams comprises a frequency bandwidth, and the means for controlling the length is configured to match the transit time of light through said each fiber to within the reciprocal of said bandwidth. The means for controlling may comprise a system for producing radio-frequency (RF) radiation, wherein said system is configured to (i) transmit said RF radiation through said each fiber and (ii) measure the phase of said RF radiation. The means for controlling the length may be configured to match the transit time of light through said each fiber to within 10 ns. An interferometer can be used to control the lengths. Each laser beam of said plurality of laser beams may comprises frequency bandwidth in excess of 1 GHz and further, may be in excess of 100 GHz.

In other exemplary embodiments, including methods of use, an array of optical fiber lasers or amplifiers emits light of a desired frequency bandwidth, wherein the transit time of light through the individual fibers is matched to within the reciprocal of that bandwidth by means of radio-frequency phase measurements. The absolute transit times through the individual fibers are matched to within 10 ns by iteratively cutting and splicing the optical fibers and verifying the degree of transit time mismatch by radio-frequency phase measurements at discreet or continuously varied modulation frequencies. The absolute transit times through the individual fibers are matched to within less than 10 ps by continuously adjusting the length of the fiber by some means, while monitoring the radio-frequency phase of a signal that is modulated at a fixed frequency. In another embodiment, an array optical fiber lasers or amplifiers emit light of a desired frequency bandwidth, where the transit times of light through the fibers that comprise the array are verified to be matched by means of spectral interference measurements. The relative optical phases of the fibers that comprise the array are matched to within one-half of the mean wavelength of the sources via an external phase-locking scheme. The individual lasers are pulsed or emit light continuously, and may have optical frequency bandwidths in excess of 1 GHz in order to circumvent stimulated Brillion scattering. Also, the individual lasers are pulsed and may have optical frequency bandwidths in excess of 100 GHz in order to allow for chirped pulse amplification schemes. An out of band continuous laser signal may be used to lock the transit times of the individual lasers to within one-half of the mean wavelength of the sources via an external phase-locking scheme. The light from the delay-matched and phase-matched fibers may be combined by achromatic method such as a chromatically-corrected diffractive element, or by a collection of beam splitters.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

Figure 1:
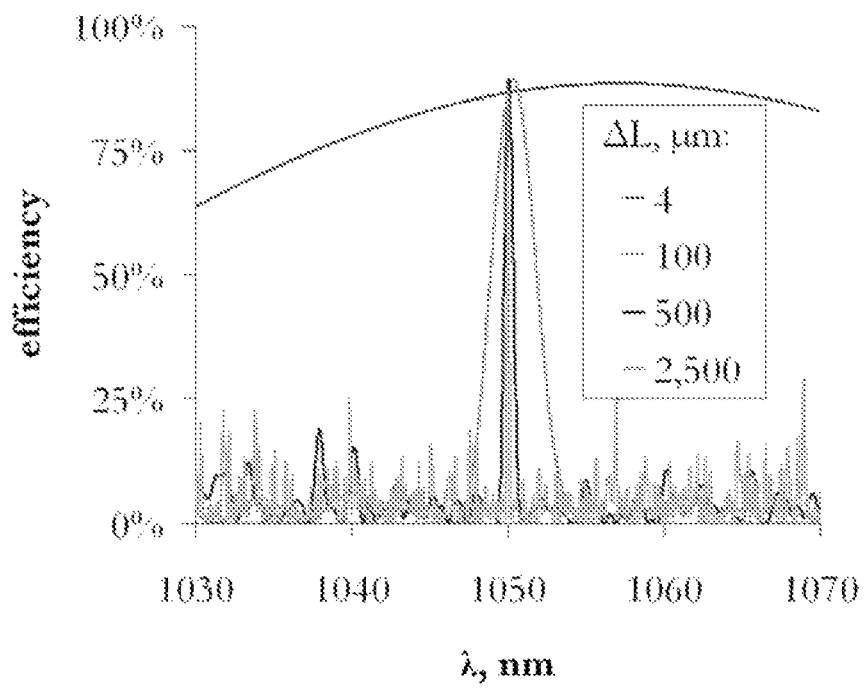
FIG. 1 shows the results of a Monte-Carlo simulation of 21 lasers, each nominally 5 m in length.

The aggregate power or pulse energy of an array of fiber lasers can be increased by increasing the number of lasers and by increasing the power generated by each laser. The former only scales the power linearly, so that to achieve a ten-fold increase in power requires (at minimum) a ten-fold increase in the number of lasers. However, if the SBS issue can be averted, then the power per laser can be increased ten-fold.

A path to averting SBS is to increase the spectral width of the laser to more than a few hundred megahertz. However, in order for the lasers to be co-phased their lengths must be matched to within a coherence length. While lasers having bandwidths on the order of 10 MHz could differ in length by as much as 30 m, their outputs would today be SBS-limited to 100-500 W. The types of lasers that today generate 6 kW have bandwidths on the order of 1 THz (5 nm), but their lengths must be matched to within 200 μm. Short pulse lasers can have bandwidths in excess of 8 THz (30 nm), but to be coherently combined, their lengths must be matched to within 40 μm.

Bear in mind that these length-matching criteria are a necessary, but not a sufficient condition, to combine the power or pulse energy of a laser array. Once the lengths have been matched to this level, the phases of the light beams emitted by the individual lasers must additionally be matched to each other.

To satisfy a given length-matching criterion and increase the output per laser to the highest possible, the challenge is to measure the lengths of the lasers to within a few meters or to within a few microns (depending on the bandwidth of the lasers), and to tune the lengths to be within the required tolerance. Techniques for accomplishing both are described below.

The nominal length of the fibers can be measured to within a few tens of centimeters with a ruler or measuring tape, or by measuring the time of flight of a pulse of light through the laser, though neither of these is necessary if the following techniques are employed. A first refined length measurement may be made with an optical modulator, a radio-frequency (RF) network analyzer, and a high speed optical detector. Alternatively, a combination of a tunable RF source and a vector volt meter may be used instead of a network analyzer. These systems allow for the measurement of the phase of the RF signal that passes through the fiber laser or system of lasers and amplifiers. By varying the frequency of the RF signal, f, and monitoring the resulting changes in the RF phase, $\Phi$, the absolute length of the laser or amplifier system can be measured, today within 1 cm, via the relationship:

$$L = \frac{c}{2\pi n} \frac{d\Phi}{df}$$

where c refers to the speed of light in vacuum and n refers to the refractive index of the optical fiber.

At this point, the fiber lengths should then be tuned to match to within the tolerance of the measurement. This may be accomplished by adding lengths of fiber or by cutting and re-splicing the fibers that comprise the lasers. Depending on the application, a second refined length measurement of length might be necessary.

Architectures are provided for coherently combining an array of fiber-based lasers. By matching their lengths to within a few integer multiples of a wavelength, the spatial and temporal properties of a single large laser are replicated, while extending the average power limit to the 100 kW range or the peak pulsed power limit to the megawatt range. Embodiments of the invention have uses in coherent x-ray generation and the coherent addition of pulses (NIF), in industrial-applications such as high-throughput micro-machining, and in military applications such as strategic defense.

Fiber-based lasers enjoy several advantages over their bulk-optic counterparts, including reliability and cost. However, they are limited in power by their host material, silica glass. An effective strategy for mitigating this problem has been to spread the power carried by the fiber over as large an area as possible. Over the past decade this has made possible a 100-fold increase in power, so that fibers can now withstand 5 kW average powers and 500 kW peak powers. Though the progress is impressive, these power levels still fall far short of the levels that can be reached by conventional lasers.

Nearly all researchers agree that the next avenue for power scaling is to combine the outputs of many fibers into a single beam. Many schemes have been proposed and demonstrated for doing this. All current methods share the following shortcomings:

1. They impose new limitations on the power carried by the constituent lasers or on the ensemble so that even the best reported result (0.5 kW total from 7 lasers is only one-tenth the power that has been obtained from a single fiber (5 kW).

2. The spatial and temporal properties of the combined beams are frustratingly different than those of the constituent lasers. This means that the arrays cannot be cascaded, and they are not applicable to sub-picosecond pulses because they do not preserve the pulses' broad, coherent spectra.

The present invention provides an approach that overcomes these shortcomings. The constituent lasers' relative phases are actively controlled to within a tenth-wave and the relative lengths are controlled to within a few wavelengths.

Embodiments of the present invention combine fiber lasers so that their aggregate output mimics that of a single larger laser in power, stability, bandwidth, and coherence. The only way to accomplish this is to make the constituent lasers functionally identical, especially their lengths, which must be trimmed and actively controlled to within $\lambda/10$, plus or minus a few exact multiples of $\lambda$.

FIG. 1 shows the results of a Monte-Carlo simulation of 21 lasers, each nominally 5 m in length. For length variations that exceed a few millimeters (but with relative phases controlled to within a $10^{th}$ of a cycle), the ensemble essentially lases at only a single wavelength. However, the bandwidth grows dramatically as the length variations decrease, until essentially the full gain bandwidth becomes available when the spread in lengths drops to a few microns (a part in $10^6$). Since this is temporally equivalent to a few tens of femtoseconds, it is no surprise that the bandwidth is now sufficient for short-pulse work.

The path to combining many lasers to truly mimicking a single larger laser is to maximize the output power/energy of each laser in the ensemble, taking care to retain sufficient beam quality and polarization fidelity for coherent combination, and maximize the dopant concentration to make the lengths as short as possible (a few meters).

It is important to make and control the lengths of the lasers in the array so that they are functionally identical (one part in $10^6$), using feedback and controls. Both ends of the fibers are mounted precisely, e.g., relying on silicon fabrication technology. Precision alignment allows for a high-selectivity cavity on the output end, and allows for an economical two-dimensional pump-coupling scheme at the input. Mutual coherence is established across the fibers in the array by coupling them in a high modal-selectivity cavity such as a self-Fourier cavity. The multiple coherent beams are combined into a single output beam.

Figure 2:
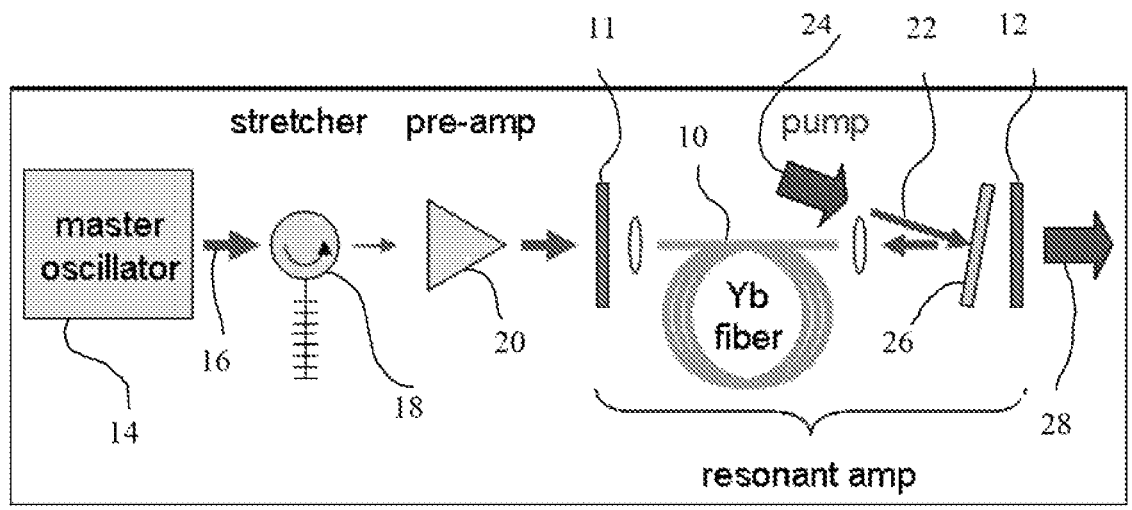
FIG. 2 shows an exemplary embodiment of the present invention in the form of a resonant master-oscillator, power-amplifier.

FIG. 2 shows an embodiment of the present invention set up as a resonant MOPA (master-oscillator, power-amplifier) amplifier. The gain fiber array 10 is placed inside a Fabry-Perot cavity formed by mirrors 11 and 12, which are tuned and locked to the free-spectral range of a preceding mode-locked fiber-based master oscillator 14. A laser pulse 16 from oscillator 14 is stretched by a pulse stretcher 18 and then amplified by a pre-amp 20 before entering the Fabry-Perot cavity. The fibers 10 are optically pumped with a laser beam 22 from a pump laser 24. Laser beam 22 is reflected into the fibers 10 by a mirror 26. The system produces an amplified output beam 28. The lengths of each of the fibers of the fiber array are individually controlled.

Figure 3:
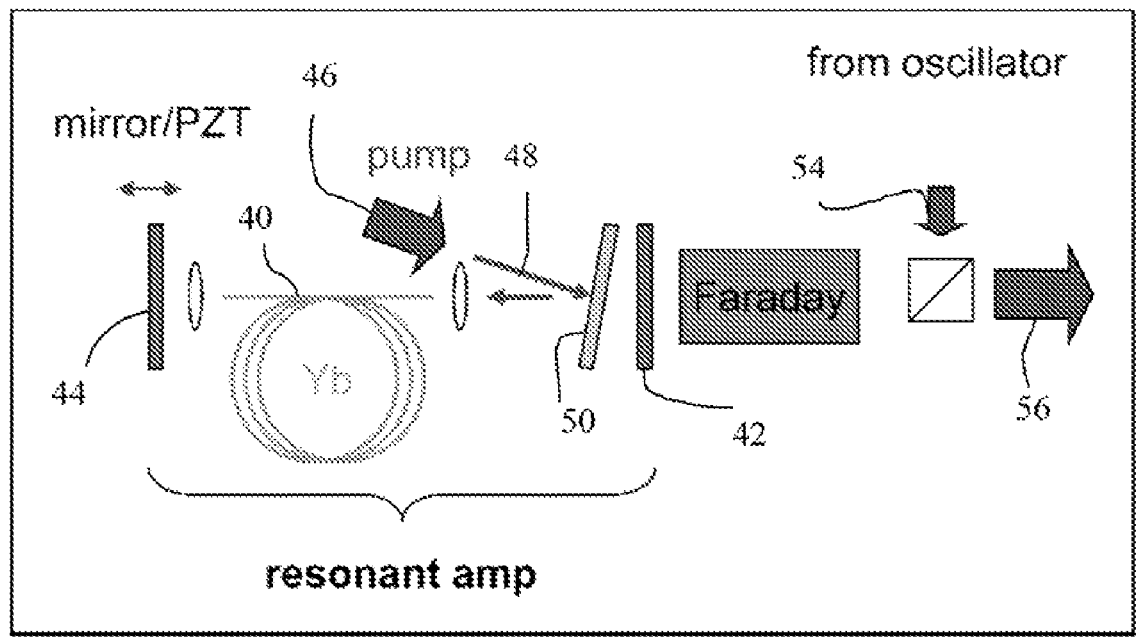
FIG. 3 shows an exemplary embodiment of the present invention in the form of a power amplifier.

FIG. 3 shows another exemplary embodiment of a power amplifier according to the present invention. In this configuration, a gain fiber array 40 is located within a Fabry-Perot cavity that is formed by mirrors 42 and 44. Mirror 44 is translatable by a PZT so that the Fabry-Perot cavity length can be adjusted. The individual fibers of the gain fiber array 40 are adjustable. A pump laser 46 produces a pump beam 48 that is injected into the gain fibers by reflecting the beam 48 from mirror 50. An oscillator produces a laser pulse 54 that is injected by a beam splitting cube, after passage through a Faraday rotator, into the Fabry-Perot cavity. The system produces an amplified output beam 56.

Figure 4:
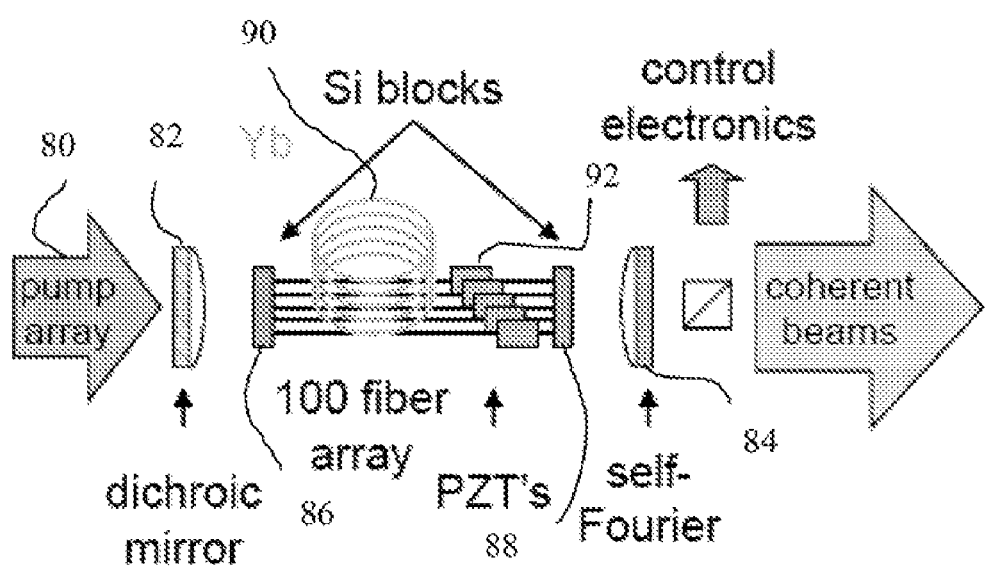
FIG. 4 shows an exemplary embodiment of a laser system of the present invention.

FIG. 4 shows an exemplary embodiment of a laser system, according to the present invention, that provides a pump laser that provides a pump beam 80 that passes through an optic 82 that has a dichroic coating which allows passage of beam 80 into a cavity formed by optic 80 and a self-Fourier laser cavity 84 for phase locking the fiber array. Within the cavity is located a 100 fiber array 90 of gain fibers. Each fiber is mounted on one end to a Si block 86 and the other end is mounted to another Si block 88. The length of each fiber is individually adjustable by its own PZT 92. In this embodiment, the gain media within each fiber is Yb. The dichroic coating of optic 82 is configured to reflect the laser beams produced within the cavity by the gain fibers. A portion of the output beam is reflected by a beam splitting cube to control electronics. The system produces coherent output beams.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

We claim:

1. A fiber optic laser array, comprising: a plurality of fiber optics, wherein each fiber optic of said plurality of fiber optics comprises an active laser gain medium; means for controlling the length of said each fiber optic; means for optically pumping said active laser gain medium of said each fiber optic to produce a plurality of laser beams; and means for phase locking said plurality of laser beams, wherein said each laser beam of said plurality of laser beams comprises a frequency bandwidth, means for controlling the length is configured to match the transit time of light through said each fiber to within the reciprocal of said bandwidth, wherein said means for controlling comprises a system for producing radio-frequency (RF) radiation, wherein said system is configured to (i) transmit said RF radiation through said each fiber and (ii) measure the phase of said RF radiation, wherein said each laser beam of said plurality of laser beams comprises a frequency bandwidth in excess of 1 GHz.

2. The array of claim 1, wherein said means for controlling the length is configured to the control the absolute length of said each fiber optic to one another to be within a few wavelengths of light.

3. The array of claim 2, wherein said means for controlling comprises a mechanism for altering each length of said lengths.

4. The array of claim 3, wherein said mechanism comprises a PZT.

5. The array of claim 1, wherein said means for controlling the length is configured to match the transit time of light through said each fiber to within 10 ns.

6. The array of claim 1, wherein said means for controlling the length includes an interferometer.

7. The array of claim 1, wherein said each laser beam of said plurality of laser beams comprises a frequency bandwidth in excess of 100 GHz.

8. A method, comprising: providing a plurality of fiber optics, wherein each fiber optic of said plurality of fiber optics comprises an active laser gain medium; controlling the length of said each fiber optic; optically pumping said active laser gain medium of said each fiber optic to produce a plurality of laser beams; and phase locking said plurality of laser beams, wherein said each laser beam of said plurality of laser beams comprises a frequency bandwidth, wherein the step of controlling the length matches the transit time of light through said each fiber to within the reciprocal of said bandwidth, wherein the step of controlling transmits radio-frequency (RF) radiation through said each fiber and measures the phase of said RF radiation, and wherein said each laser beam of said plurality of laser beams comprises a frequency bandwidth in excess of 1 GHz.

9. The method of claim 8, wherein the step of controlling the length controls the absolute length of said each fiber optic to one another to be within a few wavelengths of light.

10. The method of claim 9, wherein the step of controlling includes altering each length of said lengths.

11. The method of claim 10, wherein the step of controlling uses a PZT for altering each length of said lengths.

12. The method of claim 8, wherein the step of controlling the length matches the transit time of light through said each fiber to within 10 ns.

13. The method of claim 8, wherein the step of controlling the length uses an interferometer.

14. The method of claim 8, wherein said each laser beam of said plurality of laser beams comprises a frequency bandwidth in excess of 100 GHz.

* * * * *